US011956328B1

(12) United States Patent
Pani et al.

(10) Patent No.: US 11,956,328 B1
(45) Date of Patent: Apr. 9, 2024

(54) AVOIDING STUCK SUBSCRIBER SESSIONS ON A DISAGGREGATED BROADBAND NETWORK GATEWAY

(71) Applicant: Juniper Networks, Inc., Sunnyvale, CA (US)

(72) Inventors: Subrat Pani, Acton, MA (US); Shirish B. Dandekar, Hopkinton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 71 days.

(21) Appl. No.: 17/813,202

(22) Filed: Jul. 18, 2022

(51) Int. Cl.
*H04L 12/24* (2006.01)
*H04L 29/06* (2006.01)
*H04L 29/08* (2006.01)
*H04L 41/0604* (2022.01)
*H04L 67/143* (2022.01)
*H04L 67/146* (2022.01)
*H04L 67/54* (2022.01)

(52) U.S. Cl.
CPC .......... *H04L 67/54* (2022.05); *H04L 41/0627* (2013.01); *H04L 67/143* (2013.01); *H04L 67/146* (2013.01)

(58) Field of Classification Search
CPC ..... H04L 41/06; H04L 41/0654; H04L 67/14; H04L 67/143; H04L 67/50; H04L 67/54
See application file for complete search history.

(56) References Cited

U.S. PATENT DOCUMENTS

| 11,076,001 | B1* | 7/2021 | Mohamed | H04L 67/143 |
| 2018/0027006 | A1* | 1/2018 | Zimmermann | G06F 21/6218 726/11 |
| 2019/0069327 | A1* | 2/2019 | Kim | H04W 4/24 |
| 2022/0399958 | A1* | 12/2022 | Kumar | H04L 1/08 |

OTHER PUBLICATIONS

"3rd Generation Partnership Project; Technical Specification Group Core Network and Terminals; Interface between the Control Plane and the User Plane Nodes; Stage 3 (Release 17)" Part 1, Mar. 2022, 185 pages.
"3rd Generation Partnership Project; Technical Specification Group Core Network and Terminals; Interface between the Control Plane and the User Plane Nodes; Stage 3 (Release 17)" Part 2, Mar. 2022, 185 pages.
"Broadband Forum Technical Report, TR-459 Control and User Plane Separation for a disaggregated BNG, Issue: 1," Broadband Forum, Jun. 2020, 102 pages.

\* cited by examiner

*Primary Examiner* — Boris D Grijalva Lobos
(74) *Attorney, Agent, or Firm* — Harrity & Harrity, LLP

(57) ABSTRACT

In some implementations, a user plane (UP) device may receive a control packet indicating a logout associated with a subscriber session. The UP device may store an indication of the logout associated with the subscriber session. The UP device may determine, after storing the indication, that the logout associated with the subscriber session has not been completed within a subscriber logout period. The UP device may transmit an error indication indicating that the logout has not been completed within the subscriber logout period. In some implementations, a control plane (CP) device may (Continued)

receive the error indication indicating that the logout associated with the subscriber session has not been completed. The CP device may process the logout based at least in part on receiving the error indication. The CP device may transmit, based on processing the logout, a logout notification associated with the logout.

20 Claims, 7 Drawing Sheets

AVOIDING STUCK SUBSCRIBER SESSIONS ON A DISAGGREGATED BROADBAND NETWORK GATEWAY

BACKGROUND

A broadband network gateway (BNG) routes subscriber traffic which is aggregated via broadband access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QoS) policies, among other examples.

SUMMARY

Some implementations described herein relate to a user plane (UP) device. The UP device may include one or more memories and one or more processors. The UP device may be configured to receive a control packet indicating a logout associated with a subscriber session. The UP device may be configured to store an indication of the logout associated with the subscriber session. The UP device may be configured to determine, after storing the indication, that the logout associated with the subscriber session has not been completed within a subscriber logout period. The UP device may be configured to transmit an error indication indicating that the logout has not been completed within the subscriber logout period.

Some implementations described herein relate to a control plane (CP) device. The CP device may include one or more memories and one or more processors. The CP device may be configured to receive an error indication indicating that a logout associated with a subscriber session has not been completed. The CP device may be configured to process the logout based at least in part on receiving the error indication. The CP device may be configured to transmit, based on processing the logout, a logout notification associated with the logout.

Some implementations described herein relate to a method. The method may include receiving, by a UP device, a control packet indicating a logout associated with a subscriber session. The method may include storing, by the UP device, an indication of the logout associated with the subscriber session. The method may include determining, by the UP device and after storing the indication, that the logout associated with the subscriber session has not been completed within a subscriber logout period. The method may include transmitting, by the UP device, an error indication indicating that the logout has not been completed within the subscriber logout period. The method may include receiving, by a CP device, the error indication. The method may include processing, by the CP device, the logout based at least in part on receiving the error indication. The method may include transmitting, by the CP device and based on processing the logout, a logout notification associated with the logout.

DETAILED DESCRIPTION

Figure 1A:
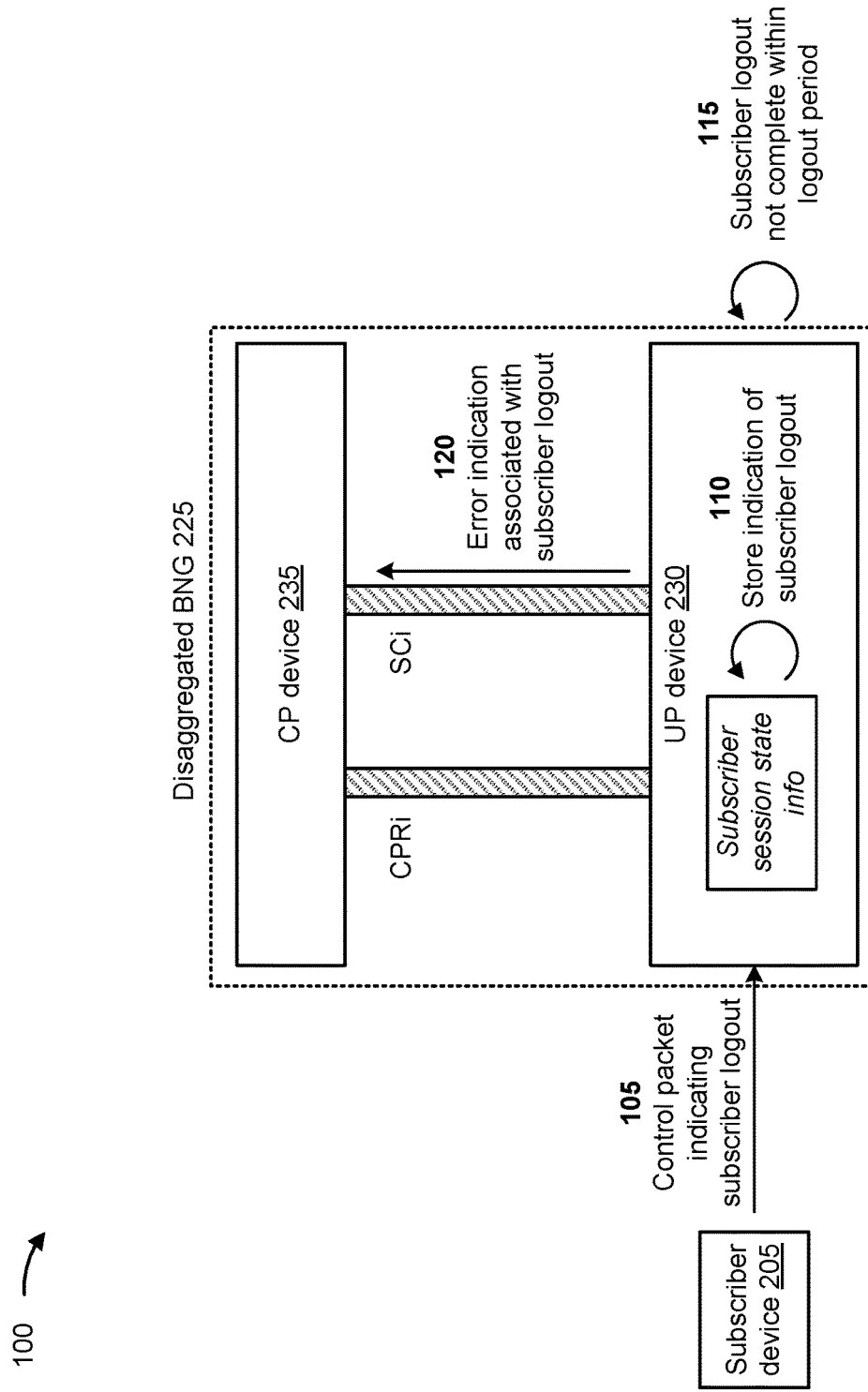
FIGS. 1A and 1B are diagrams of an example implementation associated with avoiding stuck subscriber sessions on a disaggregated broadband network gateway (BNG).

The following detailed description of example implementations refers to the accompanying drawings. The same reference numbers in different drawings may identify the same or similar elements.

To accommodate growth in a quantity of subscribers, a quantity and types of services being provided by BNGs, and an amount of traffic being processed by BNGs, a disaggregated BNG (also referred to as a DBNG) may be deployed by a service provider. A disaggregated BNG physically and logically separates a control plane and a user plane (also termed a "data plane"). For example, software to perform control plane functions may be distributed for execution by servers as virtualized BNG functions. Devices to implement the user plane, which may include physical network devices or virtual user plane devices, remain in a forwarding path between access networks and a data network to process packet flows according to subscriber forwarding state rules programmed by the control plane.

In operation of a disaggregated BNG, it is possible that the control plane becomes disconnected from the user plane (such that the control plane is unable to receive communications from the user plane, and vice versa). Information made available to the user plane during such a disconnect should be preserved so that, upon reconnection of the user plane to the control plane, such information can be provided to the control plane.

As one example, during a disconnect between the user plane and the control plane, subscriber devices may communicate with the user plane (e.g., via an access network (AN), a radio access network (RAN), or the like). Therefore, subscriber devices could be logging in (i.e., attempting to initiate subscriber sessions) or logging out (i.e., attempting to terminate subscriber sessions) while the control plane is disconnected from the user plane. Subscriber device login during a disconnection can be addressed by preventing new logins to the user plane while the control plane and the user plane are disconnected. However, information associated with a subscriber logout during a disconnection of the user plane and the control plane needs to be preserved so that the user plane can report the logout to the control plane upon reconnection, in order to ensure that the logout is processed by the control plane (e.g., to cause control plane and user plane resources associated with the subscriber session to be released, to ensure that the subscriber is not improperly billed during or after the disconnection, or the like).

In some deployments, when a subscriber device logs out while the user plane and the control plane are disconnected, control packets associated with the logout can be buffered. For example, all control plane packets received by the user plane can be buffered during a disconnection and, upon reconnection of the user plane and the control plane, the buffered control packets can be transmitted to the control plane for processing. However, packet buffering capability on the user plane may be limited and, furthermore, control plane packets can be relatively large in size. As a result, some control plane packets could be dropped (e.g., after packet buffers of the user plane are full and the user plane and the control plane have yet to be reconnected). Thus, in a scenario in which a control packet indicating a logout associated with a subscriber session is dropped while the user plane and the control plane are disconnected, the logout may not be properly processed by the control plane. As a result, control plane and user plane resources associated with the subscriber session may not be released, meaning that the resources would be unavailable. Additionally, the subscriber may be improperly billed after requesting a logout of the subscriber session.

Further, connections between the user plane and the control plane are stateless. Therefore, when the user plane transmits a control packet to the control plane (e.g., a control packet associated with a logout of a subscriber session), the user plane does not generally have knowledge of whether the packet was successfully received by the control plane. This means that a control packet can be lost between the user plane and the control plane even when the user plane is connected to the control plane (e.g., when the connection between the user plane and the control plane is unstable or unreliable, which may be the case for a disaggregated BNG since the user plane and the control plane are remote from one another). Thus, in a scenario in which a control packet indicating a logout of a subscriber session is lost while the user plane and the control plane are connected, the logout may not be properly processed by the control plane. As a result, similar to the disconnection scenario above, control plane resources associated with the subscriber session may not be released, meaning that the control plane resources would be unavailable for subsequent use. Additionally, the subscriber may be improperly billed after requesting a logout of the subscriber session when the control packet is lost.

Some implementations described herein provide techniques and apparatuses for avoiding stuck subscriber sessions on a disaggregated BNG. In some implementations, a user plane (UP) device may receive a control packet indicating a logout associated with a subscriber session, and may store an indication of the logout associated with the subscriber session. In some implementations, the UP device may determine, after storing the indication, that the logout associated with the subscriber session has not been completed within a subscriber logout period. The UP device may then transmit, and a control plane (CP) device may receive, an error indication indicating that the logout has not been completed within the subscriber logout period. The CP device may process the logout based at least in part on receiving the error indication. The CP device may then transmit, and the UP device may receive, a logout notification associated with the logout. The UP device may then delete the indication of the logout associated and free up all resources in use for that subscriber with the subscriber session based on receiving the logout notification. Additional details are provided below.

In some implementations, the techniques and apparatuses described herein ensure that a logout of a subscriber session during a disconnect between a user plane of a disaggregated BNG and a control plane of the disaggregated BNG is processed by the control plane, without a need to buffer a control packet associated with the logout. As a result, buffer resources of the user plane can be conserved. Furthermore, the techniques and apparatuses described herein ensure that a logout while the user plane and the control plane are connected (e.g., during normal operation) is properly processed, even if a control packet associated with the logout is lost (e.g., due to an unstable or unreliable connection between the user plane and the control plane). In this way, the disaggregated BNG may ensure that control plane resources associated with a subscriber session are released in the event of a logout and/or may ensure that a subscriber is not improperly billed (e.g., during or after a disconnection of the user plane and the control plane, after a subscriber device requests a logout, during normal operation of the disaggregated BNG, or the like).

Figure 1B:
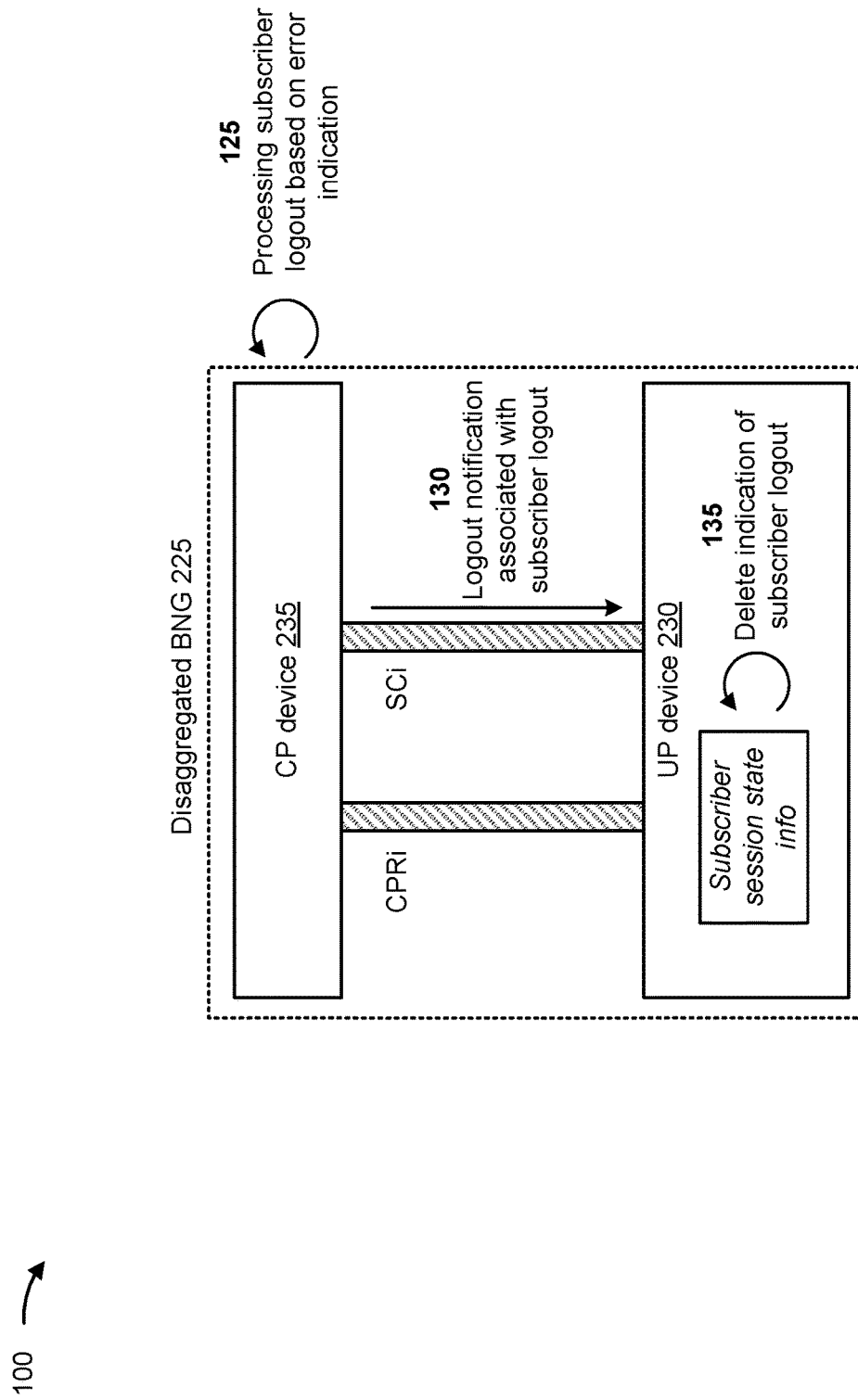

FIGS. 1A and 1B are diagrams of an example implementation 100 associated with avoiding stuck subscriber sessions on a disaggregated BNG. As shown in FIGS. 1A and 1B, example implementation 100 includes a subscriber device 205 and a disaggregated BNG 225 including a UP device 230 and a CP device 235. These devices are described in more detail below in connection with FIGS. 2-4.

In some implementations, as shown in FIGS. 1A and 1B, the UP device 230 and the CP device 235 may be configured for communication via one or more interfaces. For example, the UP device 230 and the CP device 235 may be configured for communication via a control packet redirect interface (CPRi) and a state control interface (SCi). In some implementations, the CPRi is an interface via which control packets and/or information associated with control packets are to be communicated between the UP device 230 and the CP device 235. In some implementations, the SCi is an interface via which information associated with controlling states of subscriber sessions and/or information associated with states of subscriber sessions are to be communicated between the UP device 230 and the CP device 235. In some implementations, the UP device 230 and the CP device 235 may be configured for communication via one or more additional interfaces, such as a management interface (Mi) (not shown).

As shown in FIG. 1A by reference 105, the UP device 230 may receive a control packet indicating a logout associated with a subscriber session. For example, the UP device 230 may receive, from a subscriber device 205 (e.g., via an AN and/or a RAN), a control packet indicating a logout associated with a subscriber session of the subscriber device 205. In some implementations, the control packet may include information indicating a timestamp associated with the logout (e.g., a timestamp at which a subscriber associated with the subscriber device 205 received a request for the logout of the subscriber session). Notably, in some scenarios, the UP device 230 may receive the control packet indicating the logout at a time at which the UP device 230 is disconnected from the CP device 235, as described herein.

As shown by reference 110, the UP device 230 may store an indication of the logout associated with the subscriber session. For example, the UP device 230 may be configured to maintain state information associated with subscriber sessions. Here, the UP device 230 may store an indication of the logout in the state information associated with the subscriber session. Put another way, the UP device 230 may tag the state associated with the subscriber with an indication that the subscriber session is to be logged out. Notably, in a scenario in which the UP device 230 is disconnected from the CP device 235, the UP device 230 need not buffer the control packet indicating the logout (since the UP device 230 has stored the indication of the logout of the subscriber session).

As shown by reference 115 the UP device 230 may determine, after storing the indication, that the logout associated with the subscriber session has not been completed within a subscriber logout period. The subscriber logout period is a period of time such that, after the period of time has lapsed without the logout being completed, the UP device 230 may determine that an error has occurred that has prevented the logout of the subscriber session.

In some implementations, the UP device 230 may determine that the logout has not been completed within the subscriber logout period based on a logout timer. For example, in some implementations, the UP device 230 may start a logout timer after receiving the control packet indicating the logout (e.g., upon successful reception of the control packet, upon determining that the control packet indicates the logout, upon storing the indication of the logout, or the like). Here, a duration of the logout timer corresponds to the subscriber logout period. In this example, if the UP device 230 determines that the logout timer has expired prior to completion of the logout, then the UP device 230 may determine that the logout has not been completed within the subscriber logout period. In some implementations, a duration of the logout timer may be configured or selected based on one or more factors, such as an expected latency between the UP device 230 and the CP device 235.

In some implementations, the UP device 230 may determine that the logout has not been completed within the subscriber logout period based on a timestamp associated with the control packet indicating the logout. For example, upon receiving the control packet, the UP device 230 may store a timestamp associated with the control packet. The timestamp may be a timestamp corresponding to a time at which the UP device 230 received the control packet, a timestamp (e.g., indicated in the control packet) that indicates a time at which the logout was requested (e.g., by the subscriber device 205), or another timestamp associated with the logout request or the control packet. Here, the UP device 230 may store information indicating the timestamp (e.g., in the state information associated with the subscriber). At a later time, the UP device 230 may identify the timestamp associated with the control packet indicating the logout. The UP device 230 may then determine whether a threshold amount of time has passed without the logout being completed. That is, the UP device 230 may determine a time difference between the timestamp associated with the control packet and a time at which the UP device 230 is determining whether the logout has been completed within the subscriber logout period. Here, the threshold amount of time corresponds to the subscriber logout period. In this example, if the UP device 230 determines that the time difference satisfies (e.g., is greater than or equal to) the threshold, then the UP device 230 may determine that the logout has not been completed within the subscriber logout period.

In some implementations, the UP device 230 may determine whether the logout has not been completed within the subscriber logout period based on the timestamp (automatically) on a periodic basis. In some implementations, an interval at which the UP device 230 makes such a determination may be configured or selected based on one or more factors, such as an expected latency between the UP device 230 and the CP device 235. Additionally, or alternatively, the UP device 230 may determine whether the logout has not been completed within the subscriber logout period based on the timestamp at a randomly selected time. Additionally, or alternatively, the UP device 230 may determine whether the logout has not been completed within the subscriber logout period based on the timestamp in response to a request (e.g., from another component of the UP device 230, from the subscriber device 205, or the like), or the like.

In some implementations, the UP device 230 may determine whether the logout has been completed based at least in part on the state information associated with the subscriber session. For example, if the UP device 230 determines that the state information associated with the subscriber session is still stored on the UP device 230 (e.g., that an object including the state information has not been freed), then the UP device 230 may determine that the logout associated with the subscriber session has not been completed.

As shown by reference 120, the UP device 230 may transmit, and the CP device 235 may receive, an error indication indicating that the logout has not been completed within the subscriber logout period. In some implementations, the UP device 230 may transmit, and the CP device 235 may receive, the error indication in a packet forwarding control protocol (PFCP) session report request message. In some implementations, the UP device 230 may transmit, and the CP device 235 may receive, the error indication via the SCi. For example, the UP device 230 may transmit, and the CP device 235 may receive, the PFCP session report request message via the SCi.

In some implementations, a PFCP session report request message communicated via the SCi is functional irrespective of a communication channel failure. For example, the PFCP session report request message may be generated and transmitted by the UP device 230 only after the UP device 230 determines that the UP device 230 is connected to the CP device 235. Further, the PFCP protocol may utilize a feedback mechanism, meaning that if the UP device 230 does not receive an acknowledgment from the CP device 235 regarding the PFCP session request message, then the UP device 230 determines that the CP device 235 did not successfully receive the PFCP session report request message (and may retransmit the PFCP session request message). In some implementations, the error indication may be carried in an error indication report information element (IE) of the PFCP session request message. In some implementations, information associated with the error indication may additionally or alternatively be carried in a vendor-specific error event IE of the PFCP session request message.

In some implementations, the UP device 230 may determine that the UP device 230 is connected to the CP device 235, and may generate a message including the error indication based at least in part on determining that the UP device 230 is connected to the CP device 235. That is, in some implementations, the UP device 230 may refrain from generating or transmitting the message (e.g., the PFCP session request message) including the error indication until after the UP device 230 has determined that the UP device 230 is connected to the CP device 235. In this way, resources of the UP device 230 can be conserved during a disconnection and, further, the UP device 230 increases a likelihood of the error indication being received by the CP device 235, thereby improving reliability of the error indication.

As shown in FIG. 1B by reference 125, the CP device 235 may process the logout based at least in part on receiving the error indication. For example, the CP device 235 may notify an appropriate protocol associated with the subscriber session to cause the logout of the subscriber session. In this way, the CP device 235 may process the logout of the subscriber session based on being notified of the logout of the subscriber session using an error indication communicated via the (comparatively more reliable) SCi (rather than processing the logout based on a control packet communicated via the comparatively less reliable CPRi).

As shown by reference 130, the CP device 235 may transmit, and the UP device 230 may receive, a logout notification associated with the logout. For example, after processing the logout (e.g., after performing one or more operations associated with completing the logout of the subscriber session from the perspective of the CP device 235), the CP device 235 may transmit, and the UP device 230 may receive, a logout notification indicating that the logout has been processed by the CP device 235. In some implementations, as shown in FIG. 1B, the CP device 235 may transmit, and the UP device 230 may receive, the logout notification via the SCi.

As shown by reference 135, the UP device 230 may delete the indication of the logout associated with the subscriber session based on receiving the logout notification. For example, the UP device 230 may receive the logout notification, and may delete the state information associated with the subscriber session (including the indication of the logout) from the CP Device 235. In some implementations, the UP device 230 may perform one or more other operations associated with completing the logout of the subscriber session from the perspective of the UP device 230 (e.g., freeing an object including the state information associated with the subscriber session). In some implementations, deletion of the indication causes the UP device 230 to refrain from making further determinations regarding the logout of the subscriber session. That is, upon deletion of the indication of the logout, the UP device 230 may determine that the logout of the subscriber session is completed.

As indicated above, FIGS. 1A and 1B are provided as an example. Other examples may differ from what is described with regard to FIGS. 1A and 1B. The number and arrangement of devices shown in FIGS. 1A and 1B are provided as an example. In practice, there may be additional devices, fewer devices, different devices, or differently arranged devices than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) shown in FIGS. 1A and 1B may perform one or more functions described as being performed by another set of devices shown in FIGS. 1A and 1B.

Figure 2:
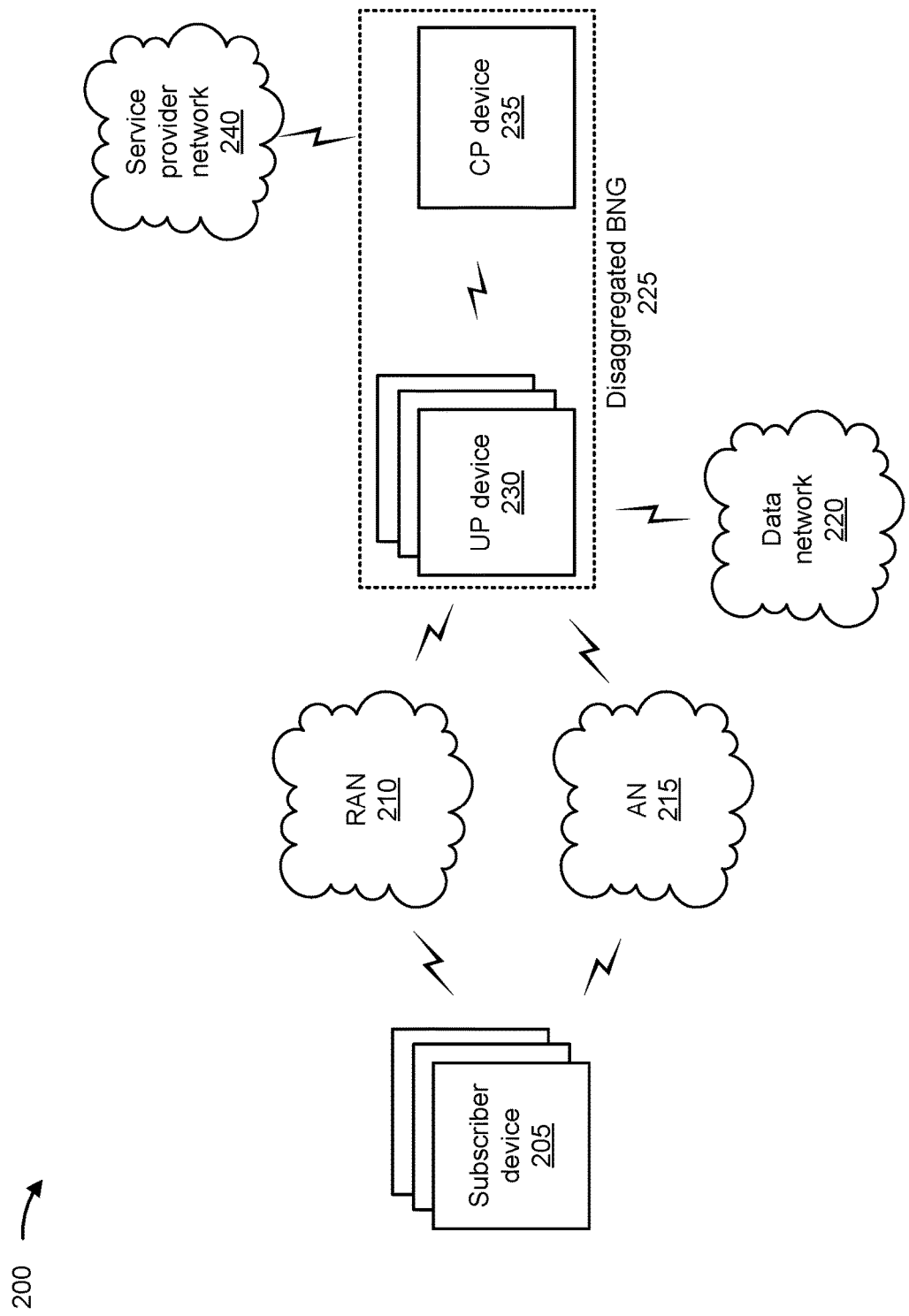
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include one or more subscriber devices 205, a radio access network (RAN) 210, an access network (AN) 215, a data network 220, a disaggregated BNG 225 including one or more UP devices 230 and a CP device 235, and a service provider network 240. Devices and/or networks of example environment 200 may interconnect via wired connections, wireless connections, or a combination of wired and wireless connections.

Subscriber device 205 includes one or more devices capable of receiving, generating, storing, processing, and/or providing information, such as information described herein. For example, subscriber device 205 may include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, or a similar type of device. In some implementations, subscriber device 205 may provide and/or receive network traffic to and/or from UP device 230 via RAN 210 or AN 215.

RAN 210 may support, for example, a cellular radio access technology (RAT). RAN 210 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for subscriber device 205. RAN 210 may transfer traffic between subscriber device 205 (e.g., using a cellular RAT), one or more base stations (e.g., using a wireless interface or a backhaul interface, such as a wired backhaul interface), UP device 230, and/or data network 220. RAN 210 may provide one or more cells that cover geographic areas.

AN 215 includes one or more wired and/or wireless networks. For example, AN 215 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. AN 215 may transfer traffic between subscriber device 205, UP device 230, and/or data network 220.

Data network 220 includes one or more wired and/or wireless data networks. For example, data network 220 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

Disaggregated BNG 225 includes one or more UP devices 230 and one or more CP devices 235 that form a disaggregated BNG, as described herein. UP device 230 includes one or more devices capable of receiving, processing, storing, routing, and/or providing traffic (e.g., a packet and/or other information or metadata) in a manner described herein. For example, UP device 230 may include a router, such as a label switching router (LSR), a label edge router (LER), an ingress router, an egress router, a provider router (e.g., a provider edge router or a provider core router), a virtual router, or another type of router. Additionally, or alternatively, UP device 230 may include a gateway, a switch, a firewall, a hub, a bridge, a reverse proxy, a server (e.g., a proxy server, a cloud server, or a data center server), a load balancer, and/or a similar device. In some implementations, UP device 230 may be a physical device implemented within a housing, such as a chassis. In some implementations, UP device 230 may be a virtual device implemented by one or more computing devices of a cloud computing environment or a data center. In some implementations, a group of UP devices 230 may be a group of data center nodes that are used to route traffic flow through a network. UP device 230 may transfer traffic between subscriber device 205 and/or data network 220. UP device 230 may perform user plane functionality for disaggregated BNG 225. In some implementations, UP device 230 may communicate with CP device 235 via one or more interfaces, as described herein.

CP device 235 includes one or more devices capable of receiving, generating, storing, processing, providing, and/or routing information, as described elsewhere herein. CP device 235 may include a communication device and/or a computing device. For example, the CP device 235 may include a server, such as an application server, a client server, a host server, a proxy server, a virtual server (e.g., executing on computing hardware), or a server in a cloud computing system. In some implementations, CP device 235 includes computing hardware used in a cloud computing environment. CP device 235 may perform control plane functionality for disaggregated BNG 225. Control plane functionality includes multiple control plane functions, such as subscriber session termination, performing signaling protocols such as Point-to-Point Protocol over Ethernet (PPPoE), IP over Ethernet (IPoE), IP address assignment and management, authentication/authorization/accounting (AAA), policy enforcement, gateway operations, lawful intercept, local management, keep-alive message processing, and configuring UP device 230. In some implementations, CP device 235 may communicate with UP device 230 via one or more interfaces, as described herein.

Service provider network 240 includes one or more wired and/or wireless networks (e.g., that are associated with a service provider, such as an Internet service provider (ISP)). For example, the service provider network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
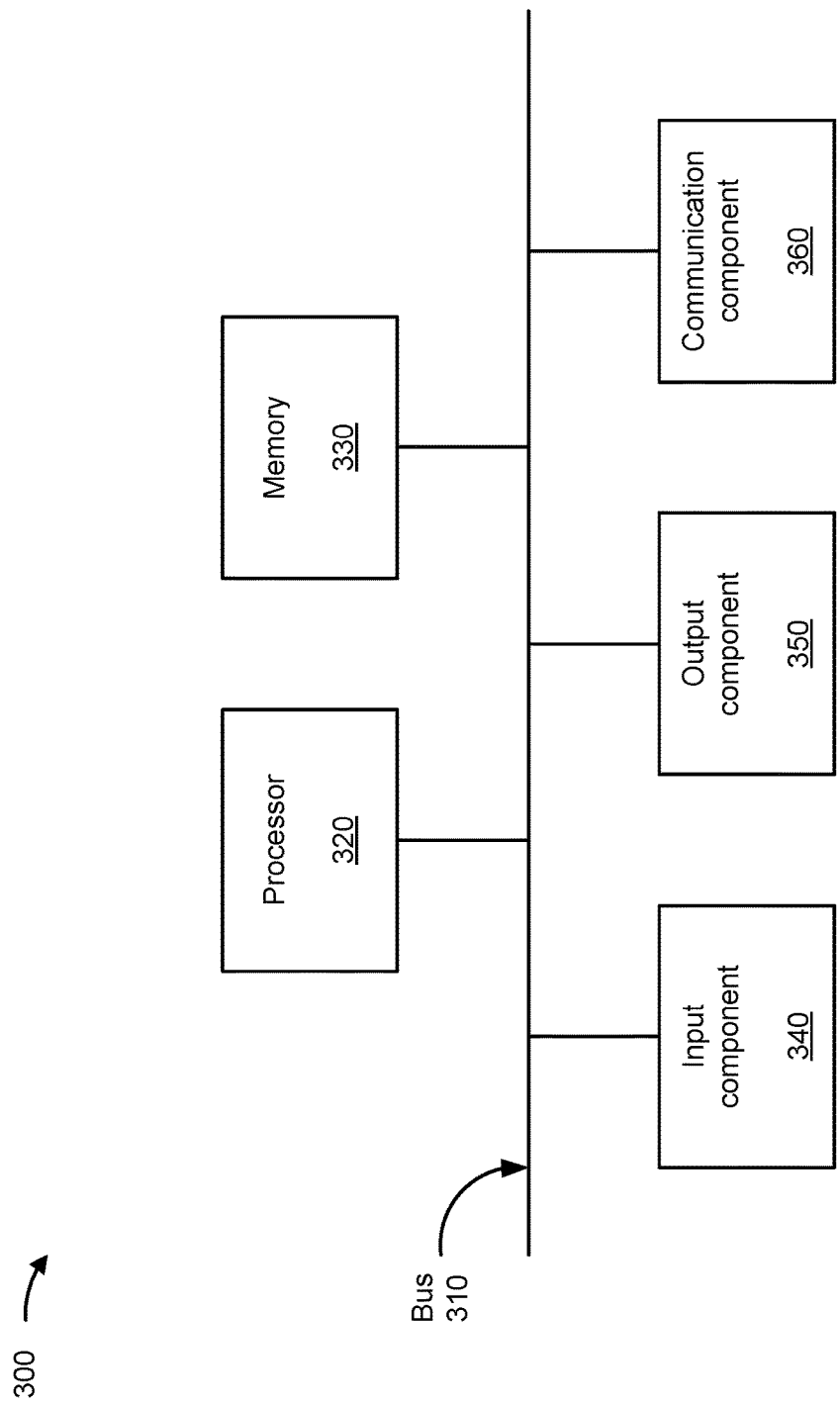
FIGS. 3 and 4 are diagrams of example components of devices associated with avoiding stuck subscriber sessions on a disaggregated BNG.

FIG. 3 is a diagram of example components of a device 300 associated with avoiding stuck subscriber sessions on a disaggregated BNG. Device 300 may correspond to subscriber device 205, UP device 230, and/or CP device 235. In some implementations, subscriber device 205, UP device 230, and/or CP device 235 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
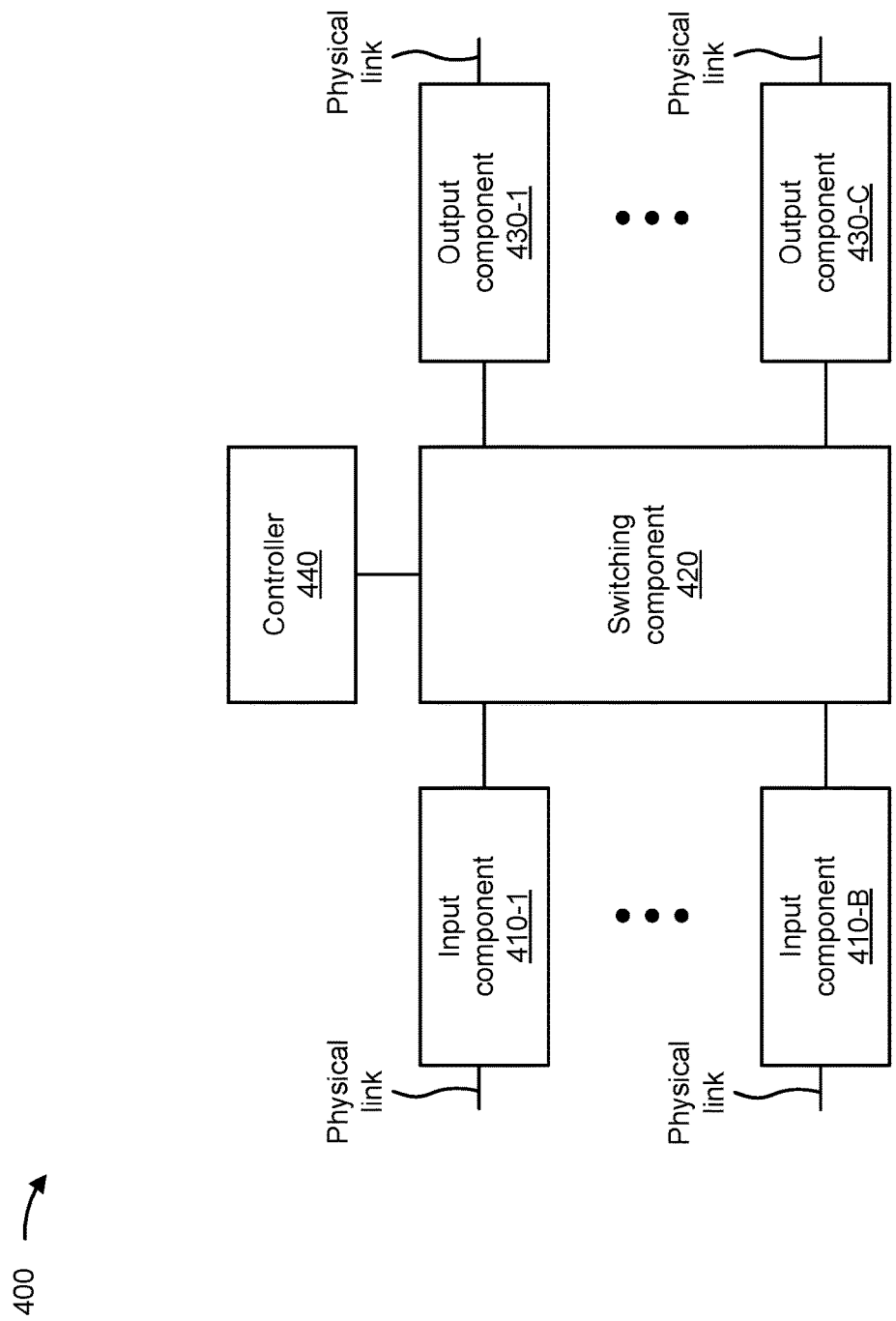

FIG. 4 is a diagram of example components of a device 400 associated with avoiding stuck subscriber sessions on a disaggregated BNG. Device 400 may correspond to subscriber device 205, disaggregated BNG 225, UP device 230, and/or CP device 235. In some implementations, subscriber device 205, disaggregated BNG 225, UP device 230, and/or CP device 235 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
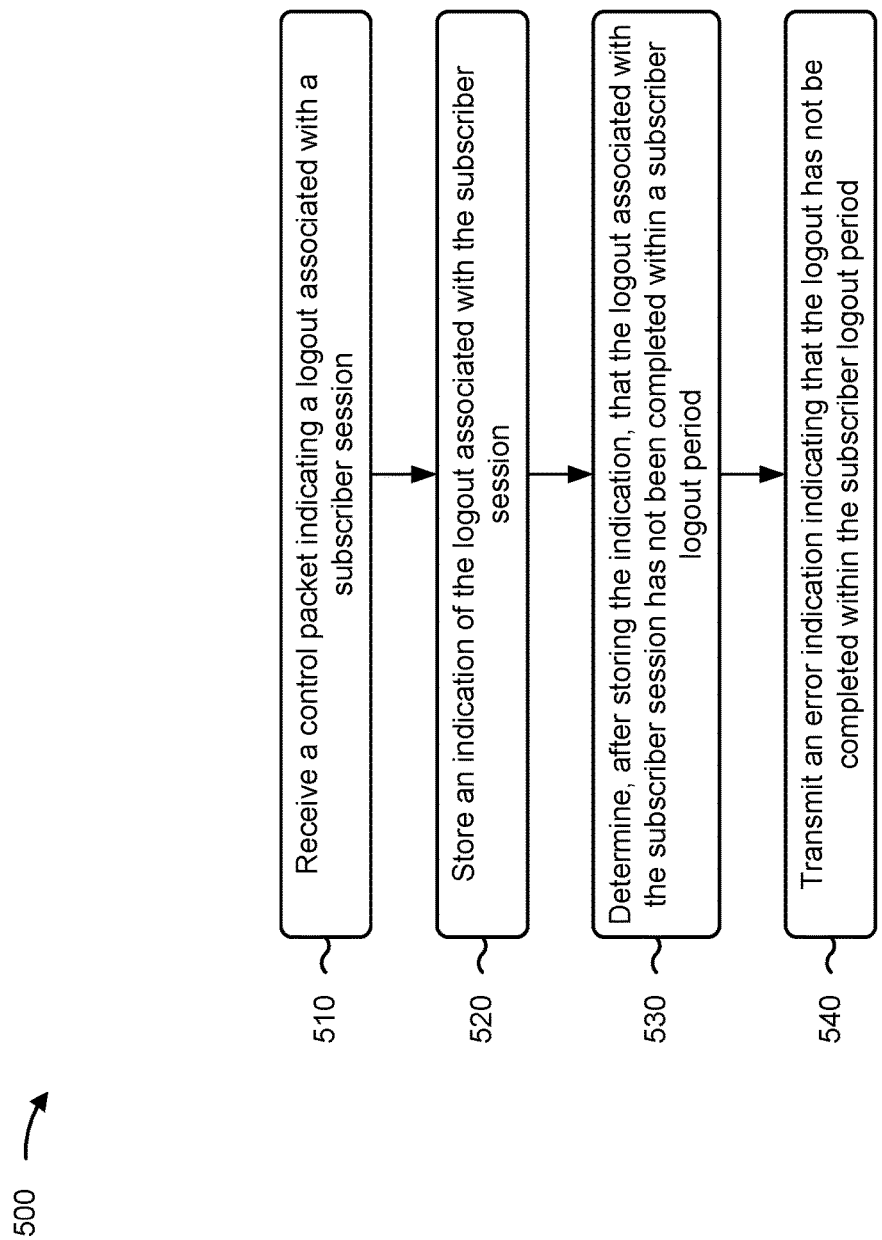
FIGS. 5 and 6 are flowcharts of example processes associated with avoiding stuck subscriber sessions on a disaggregated BNG.

FIG. 5 is a flowchart of an example process 500 associated with avoiding stuck subscriber sessions on a disaggregated BNG. In some implementations, one or more process blocks of FIG. 5 are performed by a UP device (e.g., UP device 230). Additionally, or alternatively, one or more process blocks of FIG. 5 may be performed by one or more components of device 300 or by one or more components of a device 400, as described herein.

As shown in FIG. 5, process 500 may include receiving a control packet indicating a logout associated with a subscriber session (block 510). For example, the UP device may receive a control packet indicating a logout associated with a subscriber session, as described above.

As further shown in FIG. 5, process 500 may include storing an indication of the logout associated with the subscriber session (block 520). For example, the UP device may store an indication of the logout associated with the subscriber session, as described above.

As further shown in FIG. 5, process 500 may include determining, after storing the indication, that the logout associated with the subscriber session has not been completed within a subscriber logout period (block 530). For example, the UP device may determine, after storing the indication, that the logout associated with the subscriber session has not been completed within a subscriber logout period, as described above.

As further shown in FIG. 5, process 500 may include transmitting an error indication indicating that the logout has not been completed within the subscriber logout period (block 540). For example, the UP device may transmit an error indication indicating that the logout has not been completed within the subscriber logout period, as described above.

Process 500 may include additional implementations, such as any single implementation or any combination of implementations described below and/or in connection with one or more other processes described elsewhere herein.

In a first implementation, the indication is stored in state information associated with the subscriber session.

In a second implementation, alone or in combination with the first implementation, the error indication is transmitted for reception by a CP device (e.g., CP device 235) associated with managing subscriber sessions, the CP device being disaggregated from the UP device.

In a third implementation, alone or in combination with one or more of the first and second implementations, the error indication is transmitted in a PFCP session report request message via a state control interface.

In a fourth implementation, alone or in combination with one or more of the first through third implementations, process 500 includes determining that the UP device is connected to a CP device associated with managing subscriber sessions, and generating a message including the error indication based at least in part on determining that the UP device is connected to the CP device.

In a fifth implementation, alone or in combination with one or more of the first through fourth implementations, determining that the logout has not been completed within the subscriber logout period comprises starting a logout timer after receiving the control packet indicating the logout, and determining that the logout timer has expired prior to completion of the logout.

In a sixth implementation, alone or in combination with one or more of the first through fifth implementations, determining that the logout has not been completed within the subscriber logout period comprises identifying a timestamp associated with the control packet indicating the logout, and determining, based on the timestamp, that a threshold amount of time has passed without the logout being completed.

In a seventh implementation, alone or in combination with one or more of the first through sixth implementations, process 500 includes receiving, after transmitting the error indication, a logout notification associated with the logout, and deleting the indication of the logout associated with the subscriber session based on receiving the logout notification.

In an eighth implementation, alone or in combination with one or more of the first through seventh implementations, the logout notification is received via a state control interface.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
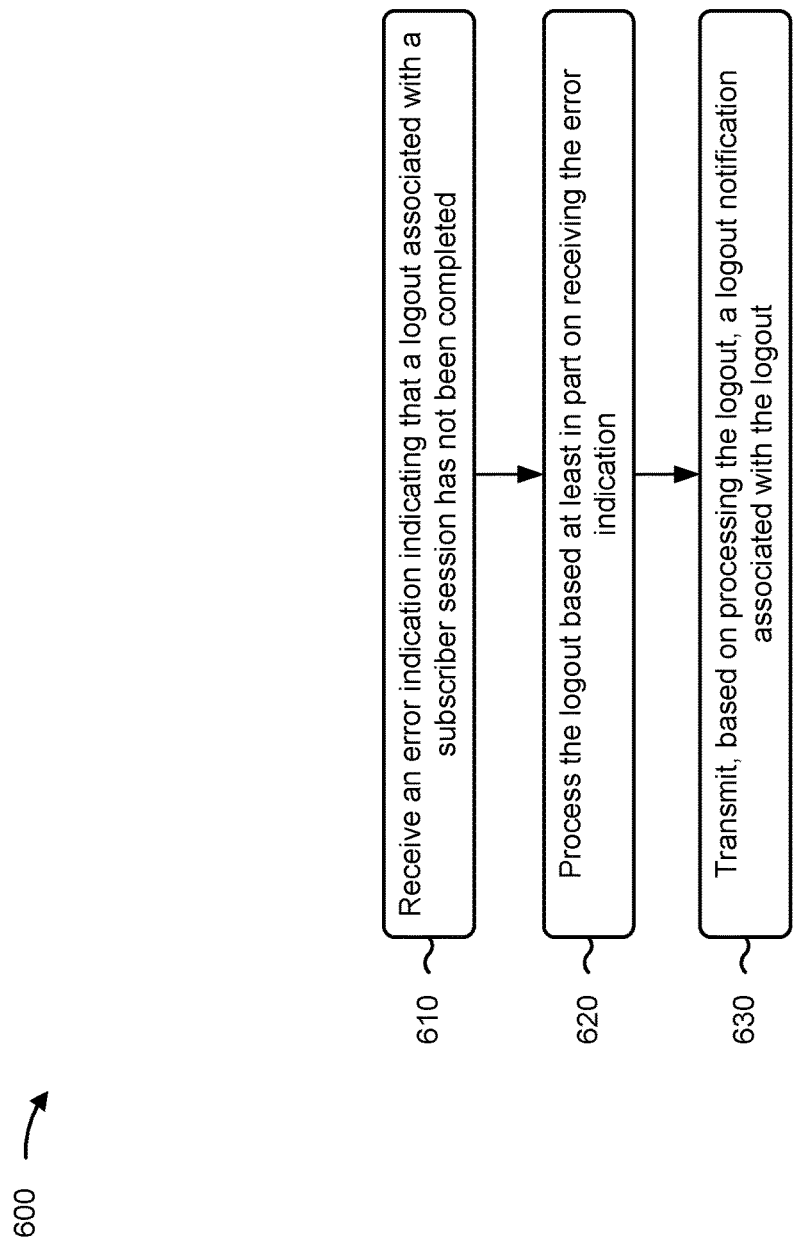

FIG. 6 is a flowchart of an example process 600 associated with avoiding stuck subscriber sessions on a disaggregated BNG. In some implementations, one or more process blocks of FIG. 6 are performed by a CP device (e.g., CP device 235). Additionally, or alternatively, one or more process blocks of FIG. 6 may be performed by one or more components of device 300 or by one or more components of a device 400, as described herein.

As shown in FIG. 6, process 600 may include receiving an error indication indicating that a logout associated with a subscriber session has not been completed (block 610). For example, the CP device may receive an error indication indicating that a logout associated with a subscriber session has not been completed, as described above.

As further shown in FIG. 6, process 600 may include processing the logout based at least in part on receiving the error indication (block 620). For example, the CP device may process the logout based at least in part on receiving the error indication, as described above.

As further shown in FIG. 6, process 600 may include transmitting, based on processing the logout, a logout notification associated with the logout (block 630). For example, the CP device may transmit, based on processing the logout, a logout notification associated with the logout, as described above.

Process 600 may include additional implementations, such as any single implementation or any combination of implementations described below and/or in connection with one or more other processes described elsewhere herein.

In a first implementation, the error indication is received from a UP device (e.g., a UP device 230) associated with managing subscriber sessions, the UP device being disaggregated from the CP device.

In a second implementation, alone or in combination with the first implementation, the error indication is received in a PFCP session report request message via a state control interface.

In a third implementation, alone or in combination with one or more of the first and second implementations, the logout notification is transmitted via a state control interface.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user plane (UP) device, comprising:
one or more memories; and
one or more processors to:
receive a control packet indicating a logout associated with a subscriber session;
store an indication of the logout associated with the subscriber session;
determine, after storing the indication, that the logout associated with the subscriber session has not been completed within a subscriber logout period; and
transmit an error indication indicating that the logout has not been completed within the subscriber logout period.

2. The UP device of claim 1, wherein the indication is stored in state information associated with the subscriber session.

3. The UP device of claim 1, wherein the error indication is transmitted for reception by a control plane (CP) device associated with managing subscriber sessions, the CP device being disaggregated from the UP device.

4. The UP device of claim 1, wherein the error indication is transmitted in a packet forwarding control protocol (PFCP) session report request message via a state control interface.

5. The UP device of claim 1, wherein the one or more processors are further to:
determine that the UP device is connected to a control plane (CP) device associated with managing subscriber sessions; and
generate a message including the error indication based at least in part on determining that the UP device is connected to the CP device.

6. The UP device of claim 1, wherein the one or more processors, to determine that the logout has not been completed within the subscriber logout period, are to:

start a logout timer after receiving the control packet indicating the logout; and
determine that the logout timer has expired prior to completion of the logout.

7. The UP device of claim 1, wherein the one or more processors, to determine that the logout has not been completed within the subscriber logout period, are to:
identify a timestamp associated with the control packet indicating the logout; and
determine, based on the timestamp, that a threshold amount of time has passed without the logout being completed.

8. The UP device of claim 1, wherein the one or more processors are further to:
receive, after transmitting the error indication, a logout notification associated with the logout; and
delete the indication of the logout associated with the subscriber session based on receiving the logout notification.

9. The UP device of claim 8, wherein the logout notification is received via a state control interface.

10. A control plane (CP) device, comprising:
one or more memories; and
one or more processors to:
receive an error indication indicating that a logout associated with a subscriber session has not been completed within a time period from when an indication of the logout was stored;
process the logout based at least in part on receiving the error indication; and
transmit, based on processing the logout, a logout notification associated with the logout.

11. The CP device of claim 10, wherein the error indication is received from a user plane (UP) device associated with managing subscriber sessions, the UP device being disaggregated from the CP device.

12. The CP device of claim 10, wherein the error indication is received in a packet forwarding control protocol (PFCP) session report request message via a state control interface.

13. The CP device of claim 10, wherein the logout notification is transmitted via a state control interface.

14. A method, comprising:
receiving, by a user plane (UP) device, a control packet indicating a logout associated with a subscriber session;
storing, by the UP device, an indication of the logout associated with the subscriber session;
determining, by the UP device and after storing the indication, that the logout associated with the subscriber session has not been completed within a subscriber logout period; and
transmitting, by the UP device, an error indication indicating that the logout has not been completed within the subscriber logout period;
receiving, by a control plane (CP) device, the error indication;
processing, by the CP device, the logout based at least in part on receiving the error indication; and
transmitting, by the CP device and based on processing the logout, a logout notification associated with the logout.

15. The method of claim 14, wherein the indication is stored in state information associated with the subscriber session.

16. The method of claim 14, wherein the UP device is disaggregated from the CP device.

17. The method of claim 14, wherein the error indication is included in a packet forwarding control protocol (PFCP) session report request message via a state control interface between the UP device and CP device.

18. The method of claim 14, further comprising:
   determining, by the UP device, that the UP device is connected to the CP device; and
   generating a message including the error indication based at least in part on determining that the UP device is connected to the CP device.

19. The method of claim 14, further comprising:
   receiving, by the UP device, the logout notification associated with the logout; and
   deleting the indication of the logout associated with the subscriber session based on receiving the logout notification.

20. The method of claim 14, wherein the logout notification is transmitted via a state control interface between the UP device and the CP device.

\* \* \* \* \*